Figure 1A:
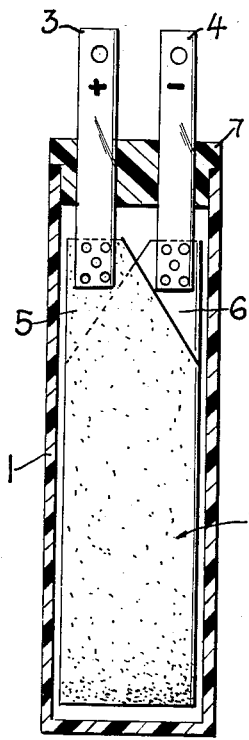

March 15, 1960

H. VOGT 2,928,888

MINIATURE ACCUMULATOR

Filed April 19, 1957

2 Sheets-Sheet 1

INVENTOR
Hans Vogt
BY
Kenyon & Kenyon
ATTORNEYS

March 15, 1960 H. VOGT 2,928,888
MINIATURE ACCUMULATOR
Filed April 19, 1957 2 Sheets-Sheet 2
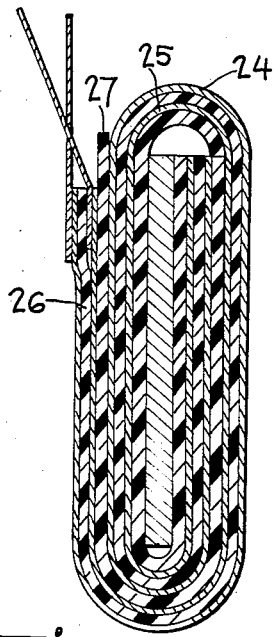
Fig. 5a
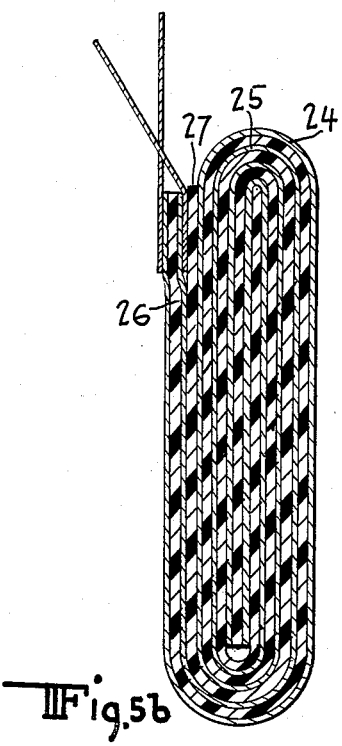
Fig. 5b
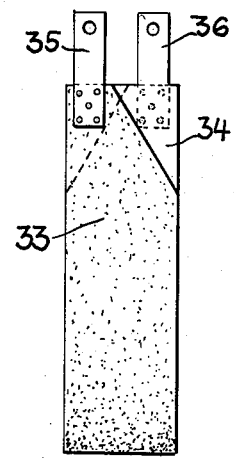
Fig. 6c.
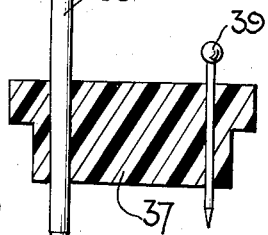
Fig. 7
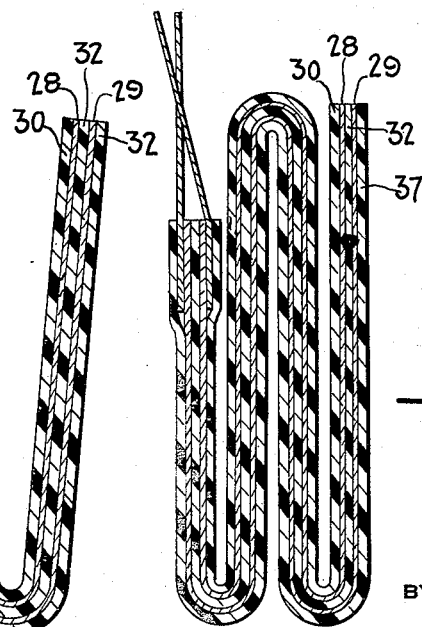
Fig. 6a
Fig. 6b
INVENTOR
Hans Vogt
BY
Kenyon & Kenyon
ATTORNEYS United States Patent Office 2,928,888
Patented Mar. 15, 1960

2,928,888

MINIATURE ACCUMULATOR

Hans Vogt, Erlau, near Passau, Germany

Application April 19, 1957, Serial No. 653,845

Claims priority, application Germany April 20, 1956

6 Claims. (Cl. 136—6)

This invention is based on the knowledge that electrodes in the form of thin foils, and in particular in the form of sintered skeleton foils owing to their large surface are very favorable for avoiding detrimental development of gas in a tightly sealed accumulator can.

It is an object of the invention to utilize such thin electrode strips for constructing a small, efficient storage battery adapted for energizing portable communication apparatuses, pocket lamps, electric razors or the like.

With this and further objects in view, the invention is based on the fact that in most of the commercial apparatuses or the like coming into question for the accommodation of small or miniature accumulators, rectangular spaces are available for accommodation of the battery. In order to utilize these spaces in the best way, a sealed miniature accumulator has been developed consisting of a pair of electrode strips with intermediate separator wound in a flat form or folded into a rectangular block and accommodated in a can of rectangular cross section. The known effective re-combination of the gas on the surfaces of the electrodes renders it possible, in connection with the use of electrodes in the form of thin foils, more particularly in the form of sintered skeleton foils, to use synthetic material, and preferably acrylic resin or polystyrene as a material for the casing. Thus my accumulators have a relatively low weight, which is particularly favorable for portable small appliances. The flat electrode coils or folded blocks are impregnated or soaked with electrolyte, i.e. operated in the tightly sealed can without an additional reserve of electrolyte, and the interior space of the can not filled up by the electrodes in case of overcharging forms a gas collecting or pressure compensating space.

By the use of the flat wound or folded electrode strip even accumulators with rectangular cross section and foil electrode block have only one connection for the positive and negative electrodes, respectively, whereby the construction of the miniature accumulators according to the invention is greatly simplified. Connecting wires, lugs or the like extending through the cover so as to be tightly sealed against the passage of gas and lye are welded to the ends of the electrode strips which ends may be cut in the form of lugs and are disposed on the outside of the coil or of the block. Before the welding, the strip ends are annealed in a hydrogen flame or compressed and compacted in a non-impregnated state of the skeleton foil. The cover or lid is connected to the can of the accumulator by gluing or cementing.

By the annealing of the ends of the electrodes in a hydrogen flame the hydroxide of the nickel is reduced to metallic nickel and the hydroxide of the cadmium is reduced to metallic cadmium, which is then evaporated, so that the connecting wires or the like can be welded to the impregnated electrode strips without difficulties. Of course, it is also possible to prepare the ends of the electrode strips for the welding of the connecting wires or the like before impregnating the electrodes, by compacting the sintered skeleton by compression, so that these portions are not filled with hydroxide in the impregnating process.

The miniature cell according to the invention can be combined into multi-cell batteries by cementing their cans of synthetic material together. Thus it is possible, by cementing together a plurality of standard cells, to obtain so-called tension batteries if the combined cells are electrically connected in series. With such series connection, more particularly if the cell battery is discharged to a very low point, the danger of increased development of gas in the various cell cans exist especially if the cells which are electrically connected in series have not quite the same capacity and cause reversing of the cells of lower capacity during the excessive discharging.

According to the invention, each cell of a two- or multi-cell battery is provided with a closure or seal which is elastic against pressure and formed by a gas discharge hole, preferably having a diameter of a few tenths of a millimeter, in the cell can, and more particularly in the lid or in one of the side walls of the can, this hole being elastically covered by a small sheet of synthetic material cemented or welded on the outer side in such a way that leakage paths for the gas are produced between the covering sheet and the wall of the can or lid in the non-hardening cemented or welded layer existing there. Through these leakage paths the fine gas bubbles discharged through the gas discharge hole creep continuously, depending on the pressure conditions, through the tough-elastic or viscous cemented or welded layer, while the leakage paths are closed again after the seepage of gas bubbles in a continuous interplay of the pressure by the adhesion effect of the viscous adhesive or cement. For this pressure-elastic sealing of the can the commercial adhesive film known under the trade name of "Tesa" film, more particularly with a double-linked adhesive layer, has proved to be very suitable. Thus, each cell is sealed pressure-elastically in such a way that the internal pressure of the cell with each accumulation of gas is reduced to a minimum figure if the cell for instance is operated in series connection with cells of a higher capacity in a state of excessive discharge.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 2A:
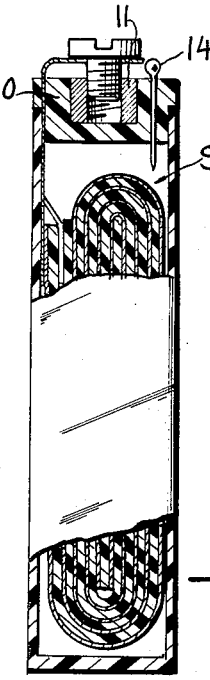
Figure 3A:
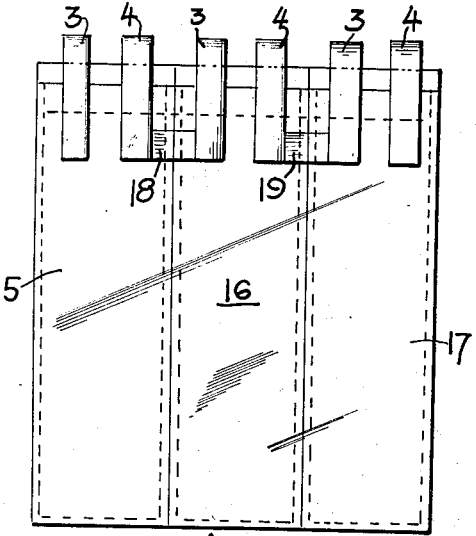
Figure 1B:
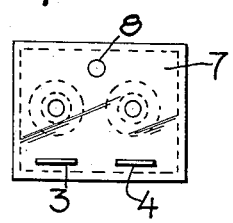
Figure 2B:
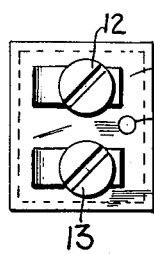
Figure 3B:
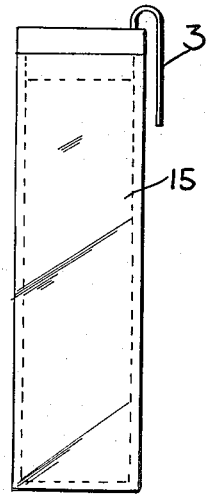
Figure 4A:
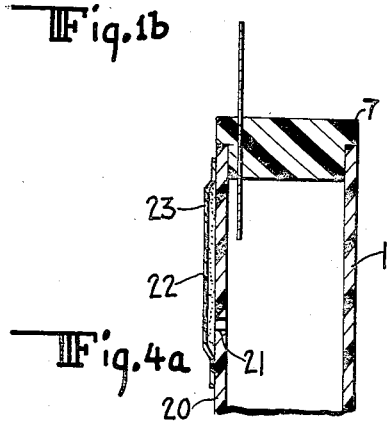
Figure 4B:
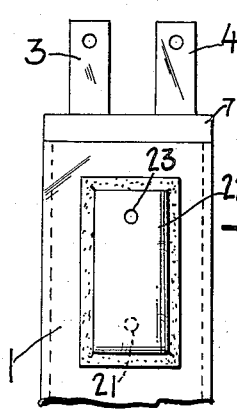

Fig. 1a is a vertical section through a first embodiment of a cell having the invention applied thereto, Fig. 1b is a plan view thereof, Fig. 2a is a view similar to Fig. 1a, but showing a modification, Fig. 2b is a plan view thereof, Fig. 3a is a front view of a multi-cell battery, Fig. 3b is a side view thereof, Fig. 4a is a detailed vertical sectional view of the cell showing the excess pressure safety device, Fig. 4b is a side view thereof, Fig. 5a is an end view illustrating an electrode coil during an intermediate stage of its manufacture, Fig. 5b is an end view of the coil of Fig. 5a in a finished state, Fig. 6a is an end view showing a folded electrode in an intermediate stage of its manufacture, Fig. 6b is a similar view but showing the final state of the folded electrode pack, Fig. 6c is a side view thereof, and Fig. 7 is a sectional view showing a detail.

Similar reference numerals denote similar parts in the different views.

Referring now to the drawing in greater detail, and first to Figs. 1a and 1b, it will be noted that these figures show a miniature cell of 50 mms. height, 13 mms. width and 13 mms. depth with a nominal capacity of 0.4 Ah. The weight of the cell in a serviceable condition is 16 grams. A folded electrode block 2 which will be described in greater detail with reference to Figs. 6a, b, c, formed by a pair of electrodes, is inserted in a can or jar 1 of a material known under the trade name of "Plexiglas" and consisting of acrylic resin (poly methacrylic acid methyl ester). The positive and negative connecting lugs 3 and 4, respectively, are welded to the ends 5 and 6 of the positive and negative electrode strips disposed on the outer side of the block, and traverse the lid 7 of the casing with a gastight seal. The lid 7 in turn is cemented in the casing 1, with a tight seal. Provided in the lid 7 is a fill hole 8 for the electrolyte, said hole 8 being closed by driving in a stopper pin or the like, when the cell after the filling in of electrolyte liquid and repeated overcharging with successive pouring out of the electrolyte liquid not soaked up by the electrode coil has been prepared for operation in a gastight condition.

In Figs. 2a and 2b a similar cell has been shown but fitted with a flat electrode coil 9 as per Fig. 5b, nuts 11 for the terminal screws 12 and 13 being embedded in the lid 10, in the injection moulding process. The fill hole 8 for the electrolyte is closed by a sealing or closure pin 14.

Figs. 3a and 3b show a multi-cell battery, in which the cans of synthetic material of the cells 15, 16, and 17 are glued together on their side walls. Contact bridges 18 and 19 serve to provide an electric series connection between the cells to form a tension battery. If desired, the contact lugs may be bent over, as shown in Fig. 3b.

Figs. 4a and 4b show the provision, on the side wall 20 of the cell can 1, of an excess pressure safety device consisting of a small sheet 22 of elastic synthetic material covering the hole 21 and being glued or welded on the outer surface of the wall 20 of the can. At a point remote from the hole 21 in the wall 20 of the can the sheet 22 has an opening 23, so that a seepage path to the discharge 23 is provided by the sheet 22 loosely attached to the wall 20 of the can for the gas bubbles discharged from the hole 21 in case of an inadmissible rise of the pressure. This type of excess pressure safety valve proved to be simple and advantageous for synthetic material cans of accumulators to be operated in a gastightly sealed condition.

A mode of manufacturing a flat electrode coil inserted in a cell as per Fig. 2a is shown in Figs. 5a and 5b. At first a preliminary coil is made on a flat mandrel of suitable dimensions, as per Fig. 5a. Then the coil is drawn off from the mandrel and the tightly superposed wound layer of the positive electrode 24 and the negative electrode 25 with the intermediate separators 26, 27 is pressed into a flat condition, Fig. 5b. Owing to the fact that the sintered skeleton foil electrodes are very flexible although of a high mechanical strength, it is easily possible to produce a flat electrode coil in this way. In order to ensure that the outer sides or surfaces of the electrode foils engaging the cam are also effective electrochemically and in a capacitive respect, it is necessary to use perforated carrier foils for the electrodes, in order to permit passage of the ions.

Figs. 6a, b, and c illustrate the manufacture of a pack from a strip of sintered skeleton foils. The folded strip consisting of the positive electrode 28 and the negative electrode 29 with the separators 30, 31, and 32 is prepared in a serpentine folding device as per Fig. 6a and then deformed by compressing the serpentine folded layers as per Fig. 6b. The folded block thus obtained is shown in Fig. 6c, in an elevation. As mentioned above, the ends 33 and 34 of the positive and negative electrode strips have been prepared in such a way, before the folding, that a mechanically solid and electrically conductive connection with the respective positive and negative contact lugs 35 and 36 can be effected by electric spot welding.

Fig. 7 shows a section through the cover 37, the terminals being realized by conical wires 38 forced into the same and the closure being effected by a conical needle-shaped pin 39.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. A miniature hermetically-sealed storage battery comprising a rectangular prismatic housing, a positive electrode and a negative electrode within said housing, each of said electrodes being formed of a continuous flat sintered metal foil, continuous separate sheets intermediate said electrodes, said electrodes with the separator sheets therebetween being folded upon themselves with the sides of the folded electrodes being substantially parallel to opposite sides of the housing, and a liquid electrolyte in said housing completely absorbed by the separator and the electrodes when the battery is in its discharged state.

2. A storage battery as defined in claim 1 wherein said electrodes with the separator sheets therebetween are folded to form a flattened roll.

3. A storage battery as defined in claim 1 wherein said electrodes with the separator sheets therebetween are folded into a longitudinally-compressed serpentine configuration.

4. A storage battery as defined in claim 1 wherein said housing includes a lid at the upper end thereof, said lid having a hole therein for filling and discharging the electrolyte into and from the housing, and a pin tightly inserted in said hole to seal the housing chamber.

5. A storage battery as defined in claim 1 and further including safety means in one side wall of the housing for discharging by seepage gas under excessive pressure from said housing comprising an elastic pressure-responsive sheet secured at its edges to the external surface of the housing around an aperture in the side wall of the housing, said elastic sheet having an opening therein which opens to emit gas bubbles when the pressure in the houing exceeds a desired value.

6. A storage battery as defined in claim 1 wherein the folded electrodes substantially fill the housing cavity.

References Cited in the file of this patent

UNITED STATES PATENTS

| | | |
|---|---|---|
| 2,157,629 | Rolph | May 9, 1939 |
| 2,536,699 | Ruben | Jan. 2, 1951 |
| 2,594,709 | Andre | Apr. 29, 1952 |
| 2,594,711 | Andre | Apr. 29, 1952 |
| 2,610,219 | Yardeny | Sept. 9, 1952 |
| 2,632,784 | Marsal et al. | Mar. 24, 1953 |
| 2,646,455 | Jeannin | July 21, 1953 |
| 2,661,388 | Warner et al. | Dec. 1, 1953 |
| 2,708,211 | Koren et al. | May 10, 1955 |

UNITED STATES PATENT OFFICE

CERTIFICATE OF CORRECTION

Patent No. 2,928,888                                March 15, 1960

Hans Vogt

It is hereby certified that error appears in the printed specification of the above numbered patent requiring correction and that the said Letters Patent should read as corrected below.

Column 3, line 62, for "cam" read -- can --; column 4, line 55, for "houing" read -- housing --.

Signed and sealed this 30th day of August 1960.

(SEAL)

Attest:

ERNEST W. SWIDER
Attesting Officer

ROBERT C. WATSON
Commissioner of Patents